(12) United States Patent
Dubuis et al.

(10) Patent No.: US 7,377,767 B2
(45) Date of Patent: May 27, 2008

(54) MOLD SPLIT INSERT (75) Inventors: David Dubuis, Evrange (FR); Mathieu Trusgnach, Zougftgen (FR); Marco Duarte, Differdange (LU)

(73) Assignee: Husky Injection Holding Systems Ltd., Bolton, Ontario (CA)

( * ) Notice: Subject to any disclaimer, the term of this patent is extended or adjusted under 35 U.S.C. 154(b) by 249 days.

(21) Appl. No.: 11/432,367

(22) Filed: May 12, 2006

(65) Prior Publication Data
US 2006/0283210 A1 Dec. 21, 2006

(30) Foreign Application Priority Data
Jun. 3, 2005 (CA) .................................... 2509181

(51) Int. Cl.
*B29C 45/73* (2006.01)
(52) U.S. Cl. .................... 425/547; 249/78; 249/79; 425/548; 425/552
(58) Field of Classification Search ........... 425/526, 425/547, 548, 549, 552; 249/78, 79
See application file for complete search history.

(56) References Cited

U.S. PATENT DOCUMENTS

| 1,078,207 | A | * | 11/1913 | Michael ..................... 249/79 |
| 1,322,897 | A | * | 11/1919 | Gray ......................... 249/79 |
| 4,571,171 | A | | 2/1986 | Blank et al. |
| 5,599,567 | A | * | 2/1997 | Gellert ...................... 425/526 |
| 5,632,794 | A | * | 5/1997 | Chang et al. ............... 425/552 |
| 5,652,003 | A | * | 7/1997 | Gellert ...................... 425/549 |
| 6,168,415 | B1 | | 1/2001 | Pleasant et al. |
| RE38,396 | E | | 1/2004 | Gellert |
| 6,799,962 | B2 | | 10/2004 | Mai et al. |
| 7,159,837 | B2 | * | 1/2007 | Richards ..................... 425/552 |

FOREIGN PATENT DOCUMENTS

| CN | 1160181 C | 4/2004 |
| JP | 572740 A | 8/1982 |
| JP | 05031776 A | 2/1993 |
| JP | 11042644 A | 2/1999 |
| TW | M264102 U | 11/2005 |

OTHER PUBLICATIONS

International Search Report for PCT/CA2006/000744, dated Aug. 30, 2006, 3 pages, related to the above-identified US patent application.
Pye, R.G.W., 4th edition 1983, Injection Mould Design, Chapter 9, pp. 796-823.
Pye, R.G.W., Injection Mould Design, 4th ed, 1983, Chapter 9, pp. 796-823.
Pye,R.G.W. Injection Mould Design, 4th edition, Chapter 9, pp. 796-823.

\* cited by examiner

*Primary Examiner*—Tim Heitbrink (57) ABSTRACT

A mold split insert for use in a molding stack assembly, and in particular a preform mold neck ring insert for use in an injection molding stack assembly for making bottle mold preforms. The split insert comprises a body with a molding surface configured thereon. The split insert also includes a coolant channel configured in the body with a partition arranged therein. The partition dividing a portion of the coolant channel into a first and a second branch. A transfer coolant channel is configured between the branches.

78 Claims, 4 Drawing Sheets

MOLD SPLIT INSERT

TECHNICAL FIELD

The present invention relates, in general, to a mold split insert for use in a molding stack assembly and is particularly, but not exclusively, applicable to a preform mold neck ring insert that is configured for molding an outer surface of a neck portion of a plastic preform, or parison, of the type that may be blow molded into a bottle. More particularly, the present invention relates to the use of a partition in a coolant channel of the split insert for configuring a coolant flow between the ends of an effective coolant channel that extends substantially peripherally around a portion of a molding surface disposed thereon.

BACKGROUND OF THE INVENTION

As commonly known, a mold split insert is used in a complementary pair thereof for molding portions (e.g. threads, lugs, rings, and other laterally projecting features) of a molded article that would otherwise be entrapped therein. In particular, a portion of the molding surface is split, usually in half, between the complementary pair of split inserts, and wherein a step of de-molding the molded article is accomplished by separating the complementary split inserts.

Without specific limitation, it is known to use split inserts in a molding stack assembly for the production of injection molded preform of the type that are subsequently blow molded into plastic bottles. In such a stack assembly, the split inserts are commonly known as neck ring inserts because of their role in forming a neck portion of the molded article.

A typical injection mold for the production of plastic preforms includes one or more molding cavities. Each molding cavity is generally configured within a stack assembly of mold inserts. In the injection mold the stack assembly is typically arranged in a mold shoe that includes a set of water cooled plates and a hot runner. The hot runner distributes a flow of injected plastic melt that is received from an injection unit of a molding machine into the molding cavities.

Figure 1:
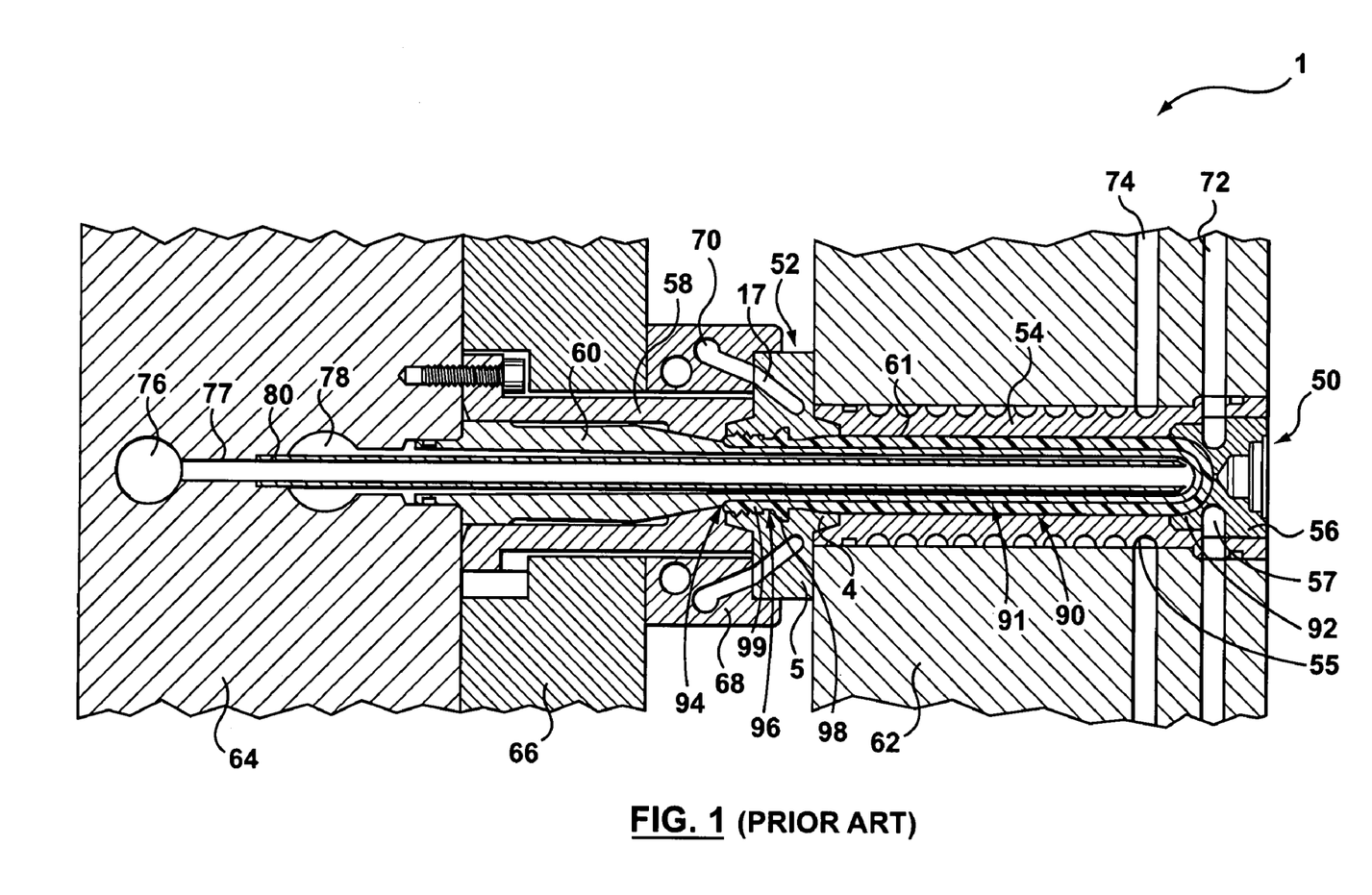
FIG. 1 is a section view through a typical preform mold molding stack assembly.

With reference to FIG. 1, a section along a portion of an injection mold 1 illustrates a typical molding insert stack assembly 50 that is arranged within a mold shoe. The molding insert stack assembly 50 includes a neck ring insert pair 52, a mold cavity insert 54, a gate insert 56, a locking ring 58, and a core insert 60, that are configured to cooperate in providing a molding cavity 61 along a set of molding surfaces disposed thereon. The mold shoe includes a cavity plate 62, a core plate 64, a stripper plate 66, and a slide pair 68. Of course, there are many other styles of injection molding insert stack assemblies 50. For instance, it is not unusual to configure the molding insert stack assembly 50 without a locking ring, and wherein the core insert is configured to include the features of the locking ring.

In more detail, the cavity insert 54 is arranged within a complementarily configured bore within the cavity plate 62, while the gate insert 56 is arranged within a bore configured in a top portion of the cavity insert 54. The cavity plate 62 includes coolant channels 72, 74 for connecting coolant channels 55, 57 configured around the cavity and gate inserts 54, 56 with a coolant source and sink (not shown). As can be seen, a substantial portion of an outside surface of the molding cavity 61, corresponding to a body and an end portion of the preform, is provided along the molding surface portions 90, 92 disposed on the cavity and gate inserts 54, 56, respectively.

Similarly, the core insert 60 is arranged on a front surface of the core plate 64, and is retained thereon by the locking ring 58. The core plate 64 also includes coolant channels 76, 77, 78 for connecting a coolant channel configured within the core insert 60 with the coolant source and sink (not shown). The core coolant channel is provided between an inside surface of a bore that is configured along a substantial length of the core insert 60 and a core cooling tube 80 that is arranged therein. Alternatively, a flow partition may be used to divide the core coolant channel into interconnected channels as described in U.S. Pat. No. 4,571,171 to Blank et al. granted on Feb. 18, 1986. As can be seen, the inside surface of the molding cavity 61, corresponding to an inside surface of the preform, is provided along the molding surface portion 91 disposed along the core insert 60. Likewise, the top surface of the molding cavity 61, corresponding to a top portion of the preform, is provided along the molding surface portion 94 disposed on the locking ring 58.

Arranged between the cavity and core inserts 54, 60 is the neck ring insert pair 52. As can be seen, the remaining portion of the outside surface of the molding cavity 61, corresponding to a neck portion of the preform, is provided along the molding surface portion 96 disposed along the inside surfaces of the neck ring insert pair 52. The neck ring insert pair 52 includes a pair of complementary neck ring inserts that are mounted on adjacent slides of the slide pair 68. The slide pair 68 is slidably mounted on a top surface of the stripper plate 66. The stripper plate 66 is arranged on the top surface of the core plate 64, and includes apertures for the locking ring and core inserts 58, 60. As commonly known, and as, for example, generally described in commonly assigned U.S. Pat. No. 6,799,962 to Mai et al, granted on Oct. 5, 2004, the stripper plate 66 is configured to be extensible relative to the core plate 61, when the mold in arranged in an open configuration, whereby the slide pair 68, and the complementary neck ring inserts mounted thereon, can be laterally driven, via a cam arrangement (not shown), for the release of the molded preform from the molding cavity 61. The slide pair 68 also includes an inlet and an outlet coolant channel 70 (only one of which is shown) for connecting a coolant channel 17 configured within each neck ring insert with the coolant source and sink (not shown).

The typical neck ring insert has a body that includes a pair of projecting portions 4 that extend from a top and a bottom face of a generally rectangular flange portion 5. An outer portion of the projecting portions are typically configured as a male taper for cooperating with a complementary female taper on the adjacent cavity, locking ring or core inserts 54, 58, 60 for aligning the neck ring insert pair therewith. Of course, other means are commonly known for aligning the neck ring inserts with the adjacent inserts, such as transposing the male and female tapers of adjacent inserts, the use of taper locks and the like. The flange and projecting portions are typically configured on an integral body composed of a hard durable material such as a tool steel, or a stainless steel.

The neck ring coolant channels 17 are typically formed (e.g. drilling) in the flange portion 5 of each neck ring insert in a simple configuration that includes two intersecting cylindrical channels in a central portion thereof. The foregoing cooling arrangement provides for a cooling of the flange portion 5 which in turns cools the projecting portion 4 and the molding surface disposed thereon through conduction.

However, with increasingly aggressive molding cycles, and the resultant reductions in mold cooling time, a temperature gradient may be imparted around the molding surface that can be a source of certain defects in the molded preform. In particular, an effect of the inhomogeneous cooling can manifest as a localized 'sink mark' (i.e. small depressions) in a relatively thick-walled preform feature (e.g. preform support ledge 98, or pilfer proof band 99) in angular positions that are in proximity to a mating interface between the neck ring inserts where the cooling is at a minimum (i.e. the molding surface is at a maximum distance to the coolant channel 17).

Alternatives to the aforementioned neck ring cooling configuration are provided with reference to U.S. Pat. No. 5,599,567 ('567) to Gellert granted on Feb. 4, 1997, or to United States Pat. RE38,396 ('396) to Gellert granted Jan. 27, 2004. In particular, these references describe neck ring inserts that include a coolant channel configuration that includes an effective channel that extends peripherally around a molding surface portion.

The '567 patent describes a neck ring half with an enclosed coolant channel configuration that includes a curved inner channel that extends around a curved inner molding surface disposed thereon. While the reference is completely silent as to a means by which to construct the neck ring insert pair, it is clear that the formation of the coolant channel configuration therein would preclude the use of conventional metal machining methods.

The '396 patent describes a method of making a neck ring insert that includes the steps of forming a inner cylindrical part, which fits in an outer flange part, wherein the inner part is made by casting rather than conventional machining methods. The inner part has a generally cylindrical outer surface with grooves therein to partially form inner portions of two coolant channels. Each coolant channel extends around the curved inner surface of one of the neck ring inserts. The outer flange part includes an opening therethrough having an inner surface which fits around the outer surface of the inner cylindrical part and having respective inlets and outlets configured therein extending to the coolant channels. The outer flange part and the inner cylindrical parts are formed separately and then brazed together. The integrally joined inner and outer parts are then cut in half along the central longitudinal axis to form the complementary neck ring insert pair.

While the foregoing examples of neck ring inserts include a coolant channel configuration that may mitigate the problem of inhomogeneous cooling around the molding surface, they are also complicated and costly to manufacture. Accordingly, there is a need for a coolant channel configuration for use in split inserts that not only provides for a substantially homogenous cooling of at least a portion of the molding surface disposed thereon but that is also relatively simple and more economical to manufacture.

SUMMARY OF THE INVENTION

In accordance with the embodiments of the present invention, a split insert is provided that advantageously obviates or mitigates at least one of the above-identified disadvantages of the prior art.

In particular, the mold split insert of the present invention includes a coolant channel configuration for providing homogenous cooling of the molding surface, and hence mitigating the problem of sink marks in the molded article, and that is also relatively simple and more economical to manufacture.

In accordance with a first aspect of the present invention, a mold split insert is provided. The mold split insert is configured to cooperate, in a complementary pair thereof, in a molding insert stack assembly for producing a molded article. The split insert comprises a body with a molding surface configured thereon. The split insert also includes a coolant channel configured in the body, and configured to receive a partition arranged in the coolant channel to divide a portion thereof into a first and a second branch, and configured to define a transfer coolant channel between the branches.

In accordance with a second aspect of the present invention a molding insert stack assembly is provided. The molding stack assembly includes a plurality of molding inserts that are configured to cooperate in configuring a molding cavity therebetween. The plurality of molding inserts includes a complementary pair of split inserts. Each of the split inserts comprises a body with a molding surface configured thereon. The split insert also includes a coolant channel configured in the body, and configured to receive a partition arranged in the coolant channel to divide a portion thereof into a first and a second branch, and configured to define a transfer coolant channel between the branches.

In accordance with a third aspect of the present invention an injection mold is provided. The injection mold includes a mold shoe with at least one molding stack assembly arranged therein. The molding stack assembly includes a plurality of molding inserts that are configured to cooperate in configuring a molding cavity therebetween. The plurality of molding inserts includes a complementary pair of split inserts. Each of the split inserts comprises a body with a molding surface configured thereon. The split insert also includes a coolant channel configured in the body, and configured to receive a partition arranged in the coolant channel to divide a portion thereof into a first and a second branch, and configured to define a transfer coolant channel between the branches.

BRIEF DESCRIPTION OF THE FIGURES

Exemplary embodiments of the present invention will now be described with reference to the accompanying Figures, in which.

DETAILED DESCRIPTION OF THE PREFERRED EMBODIMENT(S)

Figure 2A:
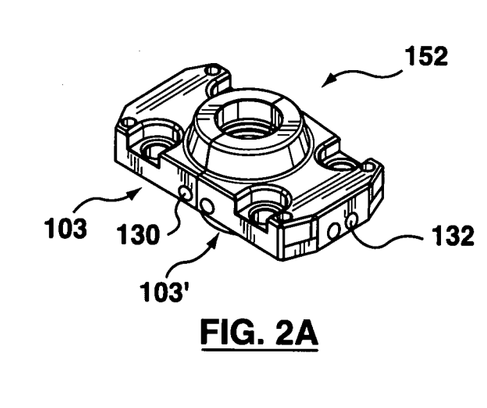
FIG. 2A is an isometric view of a neck ring insert pair in accordance with a first embodiment of the present invention.

In accordance with a first embodiment of the present invention, a mold split insert pair is shown with reference to FIG. 2A that is configured for use as a preform mold neck ring insert pair 152 for molding a neck portion of a preform (not shown). The neck ring insert pair 152 comprises a pair of complementary neck ring inserts 103, 103'. As the complementary neck ring inserts 103, 103' of the embodiment of the invention are to be similarly configured, as with the alternative embodiments that follow, only the neck ring insert 103 will be described in detail.

Figure 2B:
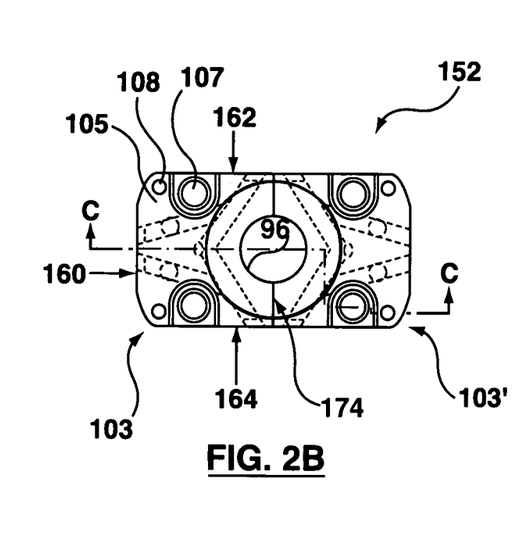
FIG. 2B is a plan view of the neck ring insert pair of FIG. 2A.
Figure 2C:
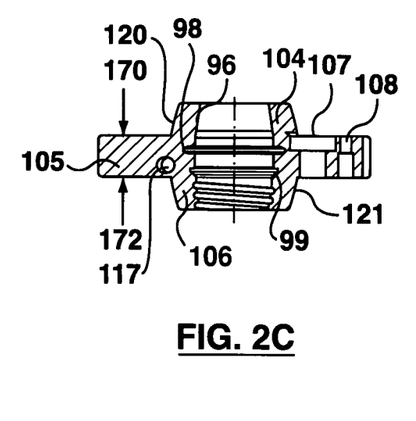
FIG. 2C is a section of the neck ring insert pair of FIG. 2A that is taken along the section line C-C as shown with reference to FIG. 2B.

As further shown with reference to FIGS. 2B & 2C, the neck ring insert 103 is preferably formed from an integral body that includes an upper and a lower projecting portions 104, 106 that extend from a top and a bottom face 170, 172 of a flange portion 105, respectively. Without specific limitation, the flange portion 105 is preferably configured to have a generally rectangular shape, and the upper and lower projecting portions 104, 106 are preferably configured to have a semi-annular shape. Accordingly, the flange portion 105 includes a rear face 160, opposing first and second side faces 162, 164, a top face 170, a bottom face 172, and a forward face 174. The upper and the lower projecting portions 104, 106 include a top and a bottom face 166, 168, respectively, a tapered face 120, 121, and a pair of front faces that form an extension of the forward face 174 of the flange 105.

The forward face 174 disposed along the flange and projecting portions 104, 106 is configured to provide a mating interface between the complementary neck ring inserts 103, 103'.

A molding surface 96 for forming a first half, without specific limitation, of an outer surface of the preform neck portion is disposed along a recess formed through the forward face 174 between the top and the bottom face 166, 168 of the projecting portions 104, 106. The complementary molding surface 96' for forming the second half of the outer surface of the preform neck portion is disposed in a similar manner on the complementary neck ring insert 103'.

The top and bottom faces 166, 168 and the tapered faces 120, 121 on the upper and lower projecting portions 104, 106 are configured to provide an upper and a lower male mating taper, respectively. The upper and the lower mating tapers are configured to cooperate with complementary female mating tapers provided on the cavity and locking ring inserts 54, 58 (FIG. 1), respectively, for achieving a proper alignment and close fit between the molding inserts. Of course, alternative configurations of mating tapers could be used such as interposing the male and female mating tapers between adjacent inserts, the use of taper locks, etc.

The neck ring insert 103 also includes mounting structure to allow for mounting of the neck ring insert pair 152 onto the slide pair 68 (FIG. 1) of the injection mold. Preferably, the mounting structure includes a pair of alignment bores 108 and cap screw counter bores 107 that are arranged on the flange portion 105 to cooperate with a dowel and a cap screw, respectively. Of course, other means may be used to mount and align the neck ring insert pair 52 onto the slide pair 68 such as aligning the rear and side faces 160, 162, 164 of the flange portion 105 with complementary surfaces on the slide 68, and by configuring a clamp that cooperates with the top surface 170 of the neck ring flange 105.

Figure 2D:
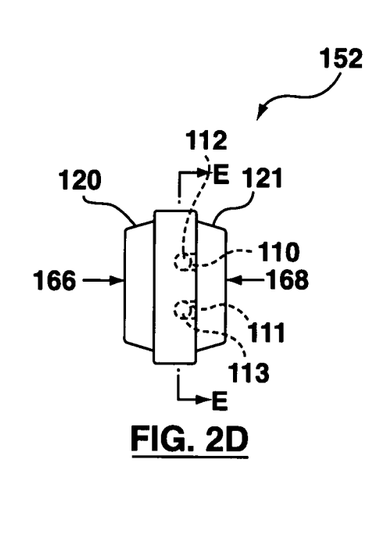
FIG. 2D is a side view of the neck ring insert pair of FIG. 2A.
Figure 2E:
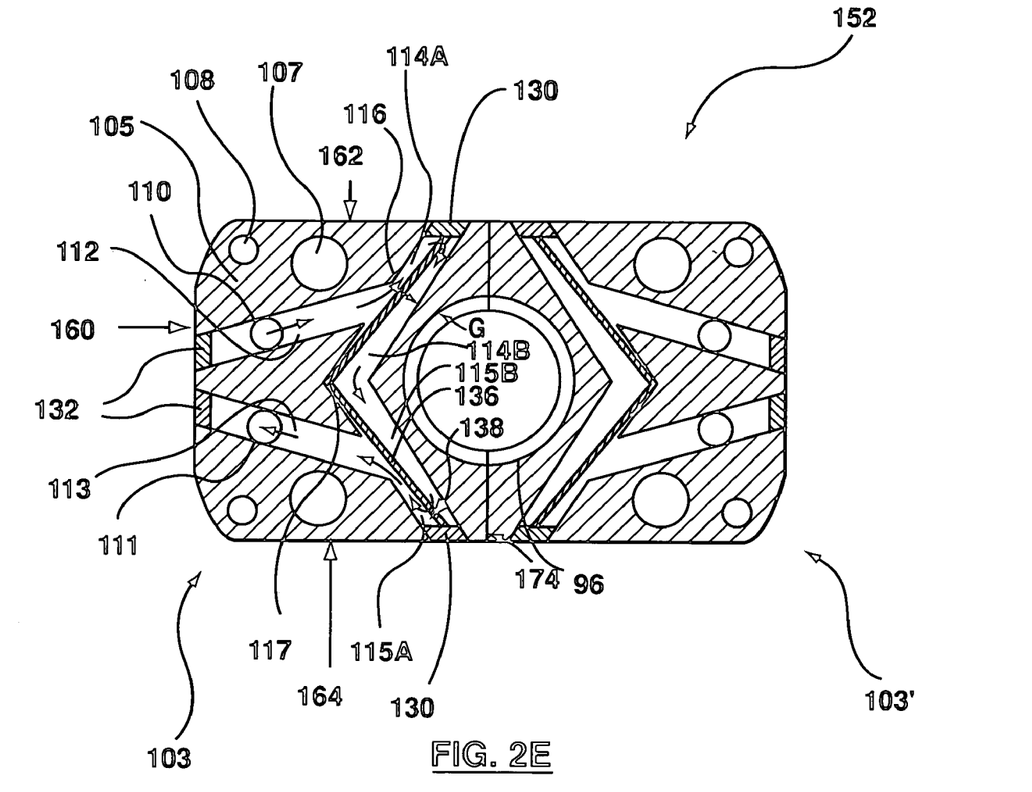
FIG. 2E is a section of the neck ring insert pair of FIG. 2A that is taken along the section line E-E as shown with reference to FIG. 2D.

With reference to FIGS. 2D & 2E, the neck ring insert 103 has a coolant channel configuration that includes an effective coolant channel, and a first and a second connecting coolant channel formed in the body thereof. As described in detail as follows, the effective coolant channel preferably includes a first and a second effective channel segment 114, 115. The first connecting coolant channel includes an inlet channel segment 110 and a first coupling channel segment 112. Similarly, the second connecting coolant channel includes an outlet channel segment 111 and a second coupling channel segment 113. The foregoing channel segments 110, 111, 112, 113, 114, 115 are preferably formed in the body of the neck ring insert 103, without specific limitation, by means of drilling. Of course, any number of the coolant channel segments are possible, and they can be formed by other means (e.g. electrical discharge machining).

The coolant inlet and outlet channel segments 110, 111 are preferably formed through the bottom face 172 of the flange portion 105 to a depth required to interconnect with the first and second coupling channel segments 112, 113, respectively. The aperture provided by the inlet and outlet channel segments 110, 111 on the bottom face 172 provide an interface for connecting the coolant channel with the inlet and outlet coolant channels 70 (FIG. 1) on the slide pair 68.

Without specific limitation, the coupling channel segments 112, 113 and the effective channel segments 114, 115 are preferably formed in the neck ring insert 103 between, generally parallel with, the top and bottom faces 170, 172 of the flange portion 105. In the present embodiment, the coupling channel segments 112, 113 are preferably configured to be closer to the bottom face 172 to avoid any interference with a top portion of cap screw counter bore 107. The effective channel segments 114, 115 are also preferably configured to be closer to the bottom face 172 whereby they are located in proximity to a portion of the molding surface that forms the relatively thick support ledge 98 and pilfer proof band 99, as shown with reference to FIG. 2C.

The coupling channel segments 112, 113 are preferably formed through the neck ring insert 103 from a rear face 160 of the flange portion 105. The coupling channel segments 112, 113 having first ends that straddle in close proximity to the middle of rear face 160 and extending towards the respective side faces 162, 164, respectively, to a depth required to interconnect with the effective channel segments 114, 115 at a connecting portal 116. The connecting portal 116 between the connecting and effective coolant channel segments 112, 113, 114, 115, is preferably located in close proximity to first ends of the corresponding effective channel segments 114, 115 adjacent the first and second faces 162, 164 of the flange portion 105 to provide an enhanced cooling in the vicinity of the forward face 174.

Likewise, the effective channel segments 114, 115 are preferably formed through the neck ring insert 103 from the first and second side faces 162, 164 of the flange portion 105, respectively. The effective channel segments 114, 115 preferably having first ends adjacent the forward face 174 and extending tangentially, and closely spaced from (as shown with reference to dimension G in FIG. 2E), the molding surface portion 96 to a depth required to intersect at second ends 117 located near the mid-portion of the flange portion 105. Accordingly, the effective coolant channel is preferably configured to extend around a substantial portion of, and substantially adjacent to, a periphery of the molding surface portion.

In the present embodiment, and without specific limitation, the connecting channel segments 112, 113 are to be formed at about a 70-degree angle from the side faces 162, 164 while the effective channel segments 114, 115 are formed at about a 60-degree angle from side faces 162, 164.

Figure 2F:
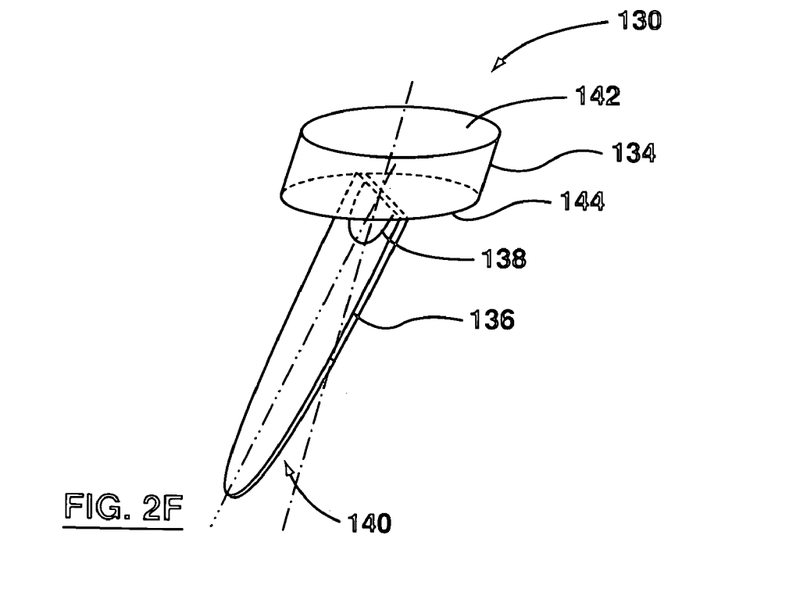
FIG. 2F is an isometric view of a plug, with an integrally formed partition, that is used in the neck ring insert pair of FIG. 2A as best shown with reference to FIG. 2E.

To complete the coolant channel, the first ends of the connecting and effective coolant channels 112, 113, 114, 115 are closed with plugs 132, 130, respectively, and as shown with reference to FIGS. 2A, 2E, and 2F. Preferably, the plugs 130, 132 are substantially cylindrical members that are first arranged and then brazed into the first ends of the connecting and effective coolant channels 112, 113, 114, 115. Advantageously, the plugs can be brazed during a step of heat treatment of the neck ring inserts 103, 103', in accordance with the commonly known method of producing molding inserts. Of course alternative means may be used to seal the apertures such as pipe plugs (FIG. 3B), welding, etc.

As shown with reference to FIG. 2B, the location of the cap screw counter bores 107 does serve to limit the proximity between the connecting portal 116 and the first ends of the effective channel segments 114, 115, as clearly a separation between the cap screw counter bores 107 and the coupling channel segments 112, 113 is required. To avoid a coolant fluid stagnation along, and hence a poor heat removal from, a dead-end portion of each effective channel segment 114, 115 disposed between the plugged first end and the connecting portal 116, a partition 136 is disposed therein. In particular, and as shown with reference to FIG. 2E, the partition 136 is preferably configured to redirect a coolant flow along the dead-end portion of the effective channel segments 114, 115 whereby the cooling of a portion of the molding surface portion 96 adjacent thereto is further improved. The foregoing is of particular significance in view of the location of the dead-end portion of the effective channel segments 114, 115 being adjacent the forward face 174 that is the problem area for sink marks as described previously.

The partition 136 is preferably arranged to divide the effective channel segments 114, 115 into a first, second, third, and fourth branches 114A, 114B, 115A, 115B, respectively, between the first ends thereof, adjacent a plug head 134, to just beyond the connecting portal 116. The partition 136 includes a transfer coolant channel 138 configured thereon that is preferably located adjacent the plug head 134 to connect the branches 114A with 114B, and 115A with 115B.

In further detail, the partition 136 is preferably arranged in the effective channel segments 114, 115 with a flow face thereof being generally parallel to the connecting portal 116. Furthermore, the partition 136 is arranged to extend along the respective effective channel segments 114, 115, inclined to the longitudinal axis thereof. A first end of the partition is preferably located at about a middle of the head 134 and a second end thereof is located between the connecting portal 116, on the same side thereof, and the area of intersection between the first and second effective channel segments 114, 115. In so doing, the first and fourth branches 114A, 115A provide a fluid connection between the connecting portals 116 to the transfer coolant channels 138. Likewise, the second and third branches 114B, 115B provide a fluid connection between the transfer coolant channels 138.

Hence, a coolant flow path through the neck ring insert 103 follows a preferred path that includes in sequence, as shown with reference to the flow lines in FIG. 2E, the inlet channel segment 110, the first coupling channel segment 112, the connecting portal 116 the first branch 114A, the transfer coolant channel 138, the second branches 114B, the third branch 115B, the transfer coolant channel 138, the fourth branch 115A, the connecting portal 116, the second coupling channel segment 113, and the outlet channel segment 111.

With reference to FIG. 2F, the plug 130 is shown in further detail. The plug head 134 and the partition 136 are preferably connected whereby the preferred arrangement of the partition 136 in the effective channel segments 114, 115 can be maintained. The plug head 134 is preferably a cylindrical body. The partition 136 is preferably configured as an elongate blade with minimal thickness. As explained previously, the partition 136 is preferably arranged to extend from about the middle of the bottom face 144 of the plug head 134 and inclined to the longitudinal axis thereof. To effectively divide the effective channel segments 114, 115, the partition 136 preferably has a contoured outer edge 140 that allows the partition 136 to generally conform to the inner surface of the effective channel segments 114, 115. The transfer coolant channel 138 is configured as an opening through a central portion of the blade 136 in close proximity to its first end. To assist in orienting the partition 136 in the effective channel segments 114, 115, and to configure a top face 142 of the plug head to be generally coplanar with the respective face 162, 162 of the flange portion 105 once installed, the top face 142 of the plug head 134 is preferably configured to be inclined to a longitudinal axis of the plug head 134 at a complementary angle to that formed by the effective channel segments 114, 115 through the respective faces 162, 164. Preferably, at least a portion of the outer edge 140 of the partition 136 is brazed welded to the inside surface of the effective channel segments 114, 115.

Figure 3A:
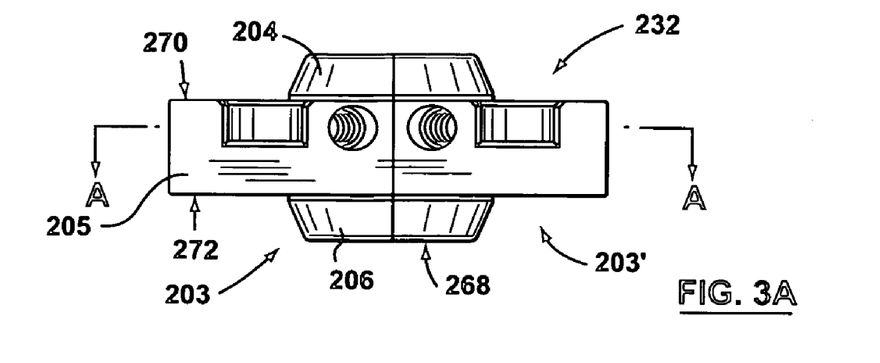
FIG. 3A is an side view of a neck ring insert pair in accordance with a second embodiment of the present invention.

With reference to FIG. 3A a neck ring insert pair 232 in accordance with a second embodiment of the present invention is shown. The neck ring insert pair 232 comprises a pair of complementary neck ring inserts 203, 203'. As the second embodiment is only a minor variant on the first embodiment, only the differences therebetween will be described. The neck ring insert 203 of the second embodiment includes a further simplification to the coolant channel configuration of first embodiment of the present invention.

Figure 3B:
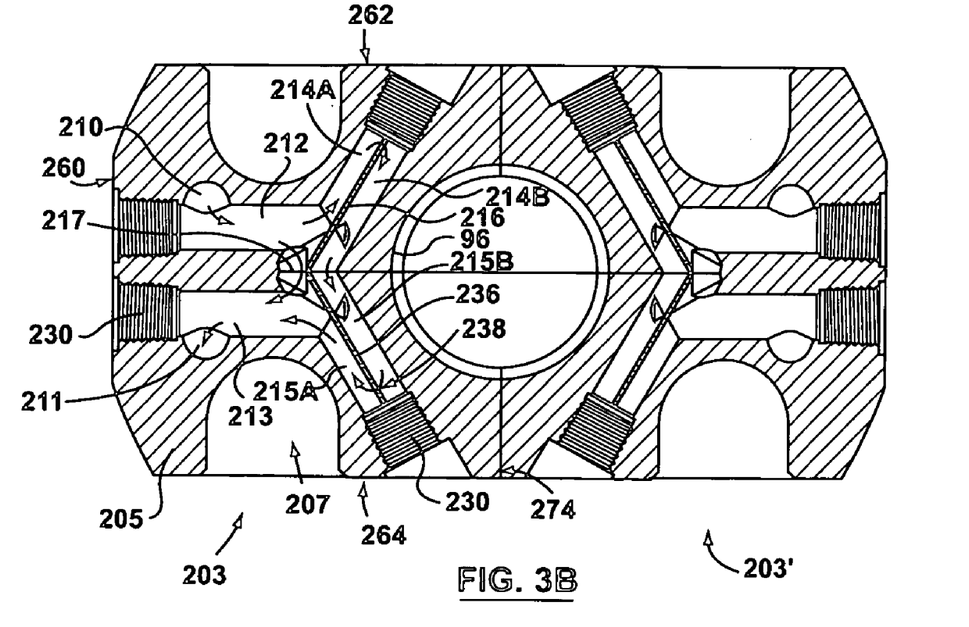
FIG. 3B is a section of the neck ring insert pair of FIG. 3A that is taken along the section line A-A as shown with reference to FIG. 3A.

With reference to FIG. 3B, it can be seen that the configuration of an inlet and outlet channel segments 210, 211, a first and a second effective channel segments 214, 215, and a first and a second coupling channel segment 212, 213 are essentially the same as that previously described. However, the arrangement of the partitions 236 in the effective channel segments 214, 215 does differ and that the coolant flow path is different as a result. In particular, the partitions 236 are preferably arranged to extend coaxially within the effective channel segments 214, 215, and along substantially the entire length thereof. In so doing, a pair of parallel coolant flow paths are configured therein. The first coolant flow path is identical to that described with reference to the description of the first embodiment. The second coolant flow path is between the first and the second coupling channel segments 212, 213, and as shown with reference to the flow lines in FIG. 2E.

Also shown in FIG. 3B are several threaded seats 230 that are configured in the neck ring body adjacent the first ends of effective and coupling channel segments 212, 213, 214, 215. The threaded seats 230 are configured for receiving typical pipe plugs (not shown) for plugging the ends of the channel segments 212, 213, 214, 215.

Figure 3C:
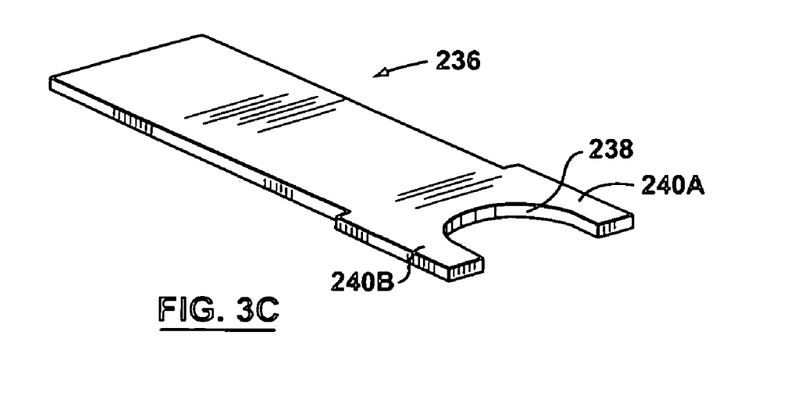
FIG. 3C is an isometric view of a partition that is used in the neck ring insert pair of FIG. 3A as best shown with reference to FIG. 3B.

With reference to FIG. 3C, the partition 236 preferably has a simplified generally rectangular body configuration. As before, the partition 236 includes a transfer coolant channel 238 that is configured as an opening therethrough that is located adjacent a first end thereof. The partition also includes a pair of locating members 240A, 240B thereon that are configured to cooperate with complementary locating members (not shown) configured in the effective channel segments 214, 215 for orienting the partition 136 in the effective channel segments 114, 115. The locating members 240A, 240B are configured along a portion of the side of the partition body, adjacent the first end thereof, as laterally extending tabs. The first end of the partition body is configured to cooperate with an inner face of the pipe plug (not shown) for retaining the partitions 236 in the effective channel segments 114, 115. A second end of the partition 236 is preferably configured to cooperate with the second end of the adjacent partition 236 to connect adjacent branches 214B with 215B. In another alternative embodiment of the partition (not shown), a single the partition is configured to extend along both of the first and second effective channel segments 214, 215. Likewise, the transfer coolant channel could simply be configured between an end of the partition and the end of the channel segment.

Thus, what has been described are various embodiments of a mold split insert pair, and more specifically those configured as neck ring pairs for use in a preform injection mold, that include a cooling structure that provides for a substantially homogenous cooling of the molding surface thereon and that is also simple and inexpensive to realize relative to the known configurations and methods of manufacture thereof.

All United States and foreign patent documents, and articles, discussed above are hereby incorporated by reference into the Detailed Description of the Preferred Embodiments.

The individual components shown in outline or designated by blocks in the attached figures are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. The scope of the following claims is to be accorded the broadest interpretation so as to encompass all such modifications and equivalent structures and functions.

What is claimed is:

1. A mold split insert configured to cooperate, in a complementary pair thereof, in a molding insert stack assembly for producing a molded article, the mold split insert comprising:
    a body;
    a molding surface configured on the body; and
    an effective coolant channel-configured in the body, the effective coolant channel includes a first effective channel segment;
having
    a partition arranged in the effective coolant channel to divide the first effective channel segment into a first branch and a second branch, and the partition configured to define a transfer coolant channel to connect the first branch with the second branch.

2. The mold split insert in accordance with claim 1, further comprising:
    a first connecting coolant channel that includes an inlet channel segment and a first coupling channel segment, the first coupling channel segment interconnects the inlet channel segment with the first branch at a first connecting portal.

3. The mold split insert in accordance with claim 2, wherein the first branch, and the second are configured to support a coolant flow between ends of the effective coolant channel.

4. The mold split insert in accordance with claim 3, wherein the effective coolant channel is configured to extend around a substantial portion of, and substantially adjacent to, a periphery of a portion of the molding surface.

5. The mold split insert in accordance with claim 4, wherein the molded article produced using the mold split insert is a preform and wherein the molding surface is configured for shaping an outer surface along a preform neck portion.

6. The mold split insert in accordance with claim 5, wherein the portion of the molding surface corresponds to a thick-walled feature on the preform neck portion.

7. The mold split insert in accordance with claim 3, wherein the effective coolant channel is configured to include a plug adjacent a first and a second end thereof.

8. The mold split insert in accordance with claim 7, wherein the transfer coolant channel is configured between an end of the partition and an inner face of the plug.

9. The mold split insert in accordance with claim 7, wherein the transfer coolant channel is configured through the partition.

10. The mold split insert in accordance with claim 9, wherein the plug includes a plug head with the partition configured to extend from an inner face thereof.

11. The mold split insert in accordance with claim 10, wherein the partition is inclined to a longitudinal axis of the plug head, and wherein the partition has a contoured outer edge that follows a profile of an adjacent inner surface of the effective coolant channel.

12. The mold split insert in accordance with claim 9, wherein the partition includes a locating member that is configured to cooperate with a complementary locating member configured in the body.

13. The mold split insert in accordance with claim 3, further comprising:
    a second effective channel segment, the second effective channel segment included in the effective coolant channel;
    a further partition arranged to divide the second effective channel segment into a third branch and a fourth branch, and the further partition configured to define a further transfer coolant channel to connect the third branch with the fourth branch; and
    a second connecting coolant channel that includes an outlet channel segment and a second coupling channel segment, the second coupling channel segment interconnects the outlet channel segment with the fourth branch at a second connecting portal.

14. The mold split insert in accordance with claim 13, wherein one of the first effective channel segment and the second effective channel segment extends in a straight direction.

15. The mold split insert in accordance with claim 14, wherein the straight channel segments are tangential to the molding surface.

16. The mold split insert in accordance with claim 13, wherein one of the first effective channel segment and the second effective channel segment extends along a curve.

17. The mold split insert in accordance with claim 16, wherein the curved channel segments are concentric with the molding surface.

18. The mold split insert in accordance with claim 13, wherein the body includes a substantially rectangular flange portion having a top face, a bottom face, a rear face, a forward face, a first side face, and a second side face.

19. The mold split insert in accordance with claim 18, wherein at least a portion of the forward face is configured as a mating interface for a complementary mold split insert.

20. The mold split insert in accordance with claim 19, wherein the molding surface is disposed along a surface of a semi-cylindrical recess formed through the forward face.

21. The mold split insert in accordance with claim 20, wherein the first effective channel segment and the second effective channel segment are configured between the top face and the bottom face of the body and generally parallel thereto.

22. The mold split insert in accordance with claim 20, wherein the first effective channel segment and the second effective channel segment are arranged to intersect within the body.

23. The mold split insert in accordance with claim 22, wherein the body further includes a projecting portion extending from one of the top face and the bottom face thereof.

24. The mold split insert in accordance with claim 23, wherein an outer surface of the projecting portion is configured for aligning the mold split insert within the molding insert stack assembly.

25. The mold split insert in accordance with claim 24, wherein a portion of the molding surface is disposed along an inner surface of the projecting portion.

26. The mold split insert in accordance with claim 24, wherein the body further includes a recessed portion that is configured for aligning the mold split insert within the molding insert stack assembly.

27. A molding insert stack assembly comprising:
a plurality of molding inserts that are configured to cooperate in configuring a molding cavity therebetween;
the plurality of molding inserts including:
a complementary pair of mold split inserts;
each of the mold split inserts comprising:
a body;
a molding surface configured on the body; and
an effective coolant channel configured in the body, having
the effective coolant channel includes a first effective channel segment;
a partition arranged in the effective coolant channel to divide the first effective channel segment into a first branch and a second branch, and the partition configured to define a transfer coolant channel to connect the first branch with the second branch.

28. The molding insert stack assembly in accordance with claim 27, wherein each of the mold split inserts further comprise:
a first connecting coolant channel that includes an inlet channel segment and a first coupling channel segment, the first coupling channel segment interconnects the inlet channel segment with the first branch at a first connecting portal.

29. The molding insert stack assembly in accordance with claim 28, wherein the first branch, and the second branch are configured to support a coolant flow between ends of the effective coolant channel.

30. The molding insert stack assembly in accordance with claim 29, wherein the effective coolant channel is configured to extend around a substantial portion of, and substantially adjacent to, a periphery of a portion of the molding surface.

31. The molding insert stack assembly in accordance with claim 30, wherein the molded article produced using the mold split insert is a preform and wherein the molding surface is configured for shaping an outer surface along a preform neck portion.

32. The molding insert stack assembly in accordance with claim 31, wherein the portion of the molding surface corresponds to a thick-walled feature on the preform neck portion.

33. The molding insert stack assembly in accordance with claim 29, wherein the effective coolant channel is configured to include a plug adjacent a first and a second end thereof.

34. The molding insert stack assembly in accordance with claim 33, wherein the transfer coolant channel is configured between an end of the partition and an inner face of the plug.

35. The molding insert stack assembly in accordance with claim 33, wherein the transfer coolant channel is configured through the partition.

36. The molding insert stack assembly in accordance with claim 35, wherein the plug includes a plug head with the partition configured to extend from an inner face thereof.

37. The molding insert stack assembly in accordance with claim 36, wherein the partition is inclined to a longitudinal axis of the plug head, and wherein the partition has a contoured outer edge that follows a profile of an adjacent inner surface of the effective coolant channel.

38. The molding insert stack assembly in accordance with claim 35, wherein the partition includes a locating member that is configured to cooperate with a complementary locating member configured in the body.

39. The molding insert stack assembly in accordance with claim 29, wherein each of the mold split inserts further comprise:
a second effective channel segment, the second effective channel segment included in the effective coolant channel;
a further partition arranged to divide the second effective channel segment into a third branch and a fourth branch, and the further partition configured to define a further transfer coolant channel to connect the third branch with the fourth branch; and
a second connecting coolant channel that includes an outlet channel segment and a second coupling channel segment, the second coupling channel segment interconnects the outlet channel segment with the fourth branch at a second connecting portal.

40. The molding insert stack assembly in accordance with claim 39, wherein one of the first effective channel segment and the second effective channel segment extends in a straight direction.

41. The molding insert stack assembly in accordance with claim 40, wherein the straight channel segments are tangential to the molding surface.

42. The molding insert stack assembly in accordance with claim 39, wherein one of the first effective channel segment and the second effective channel segment extends along a curve.

43. The molding insert stack assembly in accordance with claim 42, wherein the curved channel segments are concentric with the molding surface.

44. The molding insert stack assembly in accordance with claim 39, wherein the body includes a substantially rectangular flange portion having a top face, a bottom face, a rear face, a forward face, a first side face, and a second side face.

45. The molding insert stack assembly in accordance with claim 44, wherein at least a portion of the forward face is configured as a mating interface for the complementary mold split insert.

46. The molding insert stack assembly in accordance with claim 45, wherein the molding surface is disposed along a surface of a semi-cylindrical recess formed through the forward face.

47. The molding insert stack assembly in accordance with claim 46, wherein the first effective channel segment and the second effective channel segment are configured between the top face and the bottom face of the body and generally parallel thereto.

48. The molding insert stack assembly in accordance with claim 46, wherein the first effective channel segment and the second effective channel segment are arranged to intersect within the body.

49. The molding insert stack assembly in accordance with claim 48, wherein the body further includes a projecting portion extending from one of the top face and the bottom face thereof.

50. The molding insert stack assembly in accordance with claim 49, wherein an outer surface of the projecting portion is configured for aligning the mold split insert within the molding insert stack assembly.

51. The molding insert stack assembly in accordance with claim 50, wherein a portion of the molding surface is disposed along an inner surface of the projecting portion.

52. The molding insert stack assembly in accordance with claim 50, wherein the body further includes a recessed portion that is configured for aligning the mold split insert within the molding insert stack assembly.

53. An injection mold comprising:
a mold shoe;
at least one molding stack assembly arranged within the mold shoe;
the molding stack assembly comprising:
a plurality of molding inserts that are configured to cooperate in configuring a molding cavity therebetween;
the plurality of molding inserts including:
a complementary pair of mold split inserts;
each of the mold split inserts comprising:
a body;
a molding surface configured on the body; and
an effective coolant channel configured in the body, having the effective coolant channel includes a first effective channel segment;
a partition arranged in the effective coolant channel to divide the first effective channel segment into a first branch and a second branch, and the partition configured to define a transfer coolant channel to connect the first branch with the second branch.

54. The injection mold in accordance with claim 53, wherein each of the mold split inserts further comprise:
a first connecting coolant channel that includes an inlet channel segment and a first coupling channel segment, the first coupling channel segment interconnects the inlet channel segment with the first branch at a first connecting portal.

55. The injection mold in accordance with claim 54, wherein the first branch, and the second branch are configured to support a coolant flow between ends of the effective coolant channel.

56. The injection mold in accordance with claim 55, wherein the effective coolant channel is configured to extend around a substantial portion of, and substantially adjacent to, a periphery of a portion of the molding surface.

57. The injection mold in accordance with claim 56, wherein the molded article produced using the mold split insert is a preform and wherein the molding surface is configured for shaping an outer surface along a preform neck portion.

58. The injection mold in accordance with claim 57, wherein the portion of the molding surface corresponds to a thick-walled feature on the preform neck portion.

59. The injection mold in accordance with claim 55, wherein the effective coolant channel is configured to include a plug adjacent a first and a second end thereof.

60. The injection mold in accordance with claim 59, wherein the transfer coolant channel is configured between an end of the partition and an inner face of the plug.

61. The injection mold in accordance with claim 59, wherein the transfer coolant channel is configured through the partition.

62. The injection mold in accordance with claim 61, wherein the plug includes a plug head with the partition configured to extend from an inner face thereof.

63. The injection mold in accordance with claim 62, wherein the partition is inclined to a longitudinal axis of the plug head, and wherein the partition has a contoured outer edge that follows a profile of an adjacent inner surface of the effective coolant channel.

64. The injection mold in accordance with claim 61, wherein the partition includes a locating member that is configured to cooperate with a complementary locating member configured in the body.

65. The injection mold in accordance with claim 55, wherein each of the mold split inserts further comprises:
a second effective channel segment, the second effective channel segment included in the effective coolant channel;
a further partition arranged to divide the second effective channel segment into a third branch and a fourth branch, and the further partition configured to define a further transfer coolant channel to connect the third branch with the fourth branch; and
a second connecting coolant channel that includes an outlet channel segment and a second coupling channel segment, the second coupling channel segment interconnects the outlet channel segment with the fourth branch at a second connecting portal.

66. The injection mold in accordance with claim 65, wherein one of the first effective channel segment and the second effective channel segment extends in a straight direction.

67. The injection mold in accordance with claim 66, wherein the straight channel segments are tangential to the molding surface.

68. The injection mold in accordance with claim 65, wherein one of the first effective channel segment and the second effective channel segment extends along a curve.

69. The injection mold in accordance with claim 68, wherein the curved channel segments are concentric with the molding surface.

70. The injection mold in accordance with claim 65, wherein the body includes a substantially rectangular flange portion having a top face, a bottom face, a rear face, a forward face, a first side face, and a second side face.

71. The injection mold in accordance with claim 70, wherein at least a portion of the forward face is configured as a mating interface for the complementary mold split insert.

72. The injection mold in accordance with claim 71, wherein the molding surface is disposed along a surface of a semi-cylindrical recess formed through the forward face.

73. The injection mold in accordance with claim 72, wherein the first effective channel segment and the second effective channel segment are configured between the top face and the bottom face of the body and generally parallel thereto.

74. The injection mold in accordance with claim 72, wherein the first effective channel segment and the second effective channel segment are arranged to intersect within the body.

75. The injection mold in accordance with claim 74, wherein the body further includes a projecting portion extending from one of the top face and the bottom face thereof.

76. The injection mold in accordance with claim 75, wherein an outer surface of the projecting portion is configured for aligning the mold split insert within the molding insert stack assembly.

77. The injection mold in accordance with claim 76, wherein a portion of the molding surface is disposed along an inner surface of the projecting portion.

78. The injection mold in accordance with claim 76, wherein the body further includes a recessed portion that is configured for aligning the mold split insert within the molding insert stack assembly.

* * * * *